(12) United States Patent
Van Wyk et al.

(10) Patent No.: US 10,174,517 B2
(45) Date of Patent: Jan. 8, 2019

(54) EQUIPMENT TOWER

(71) Applicant: ATF Services Pty Ltd., New South Wales (AU)

(72) Inventors: Jonathan Van Wyk, New South Wales (AU); Mark Redding, Queensland (AU)

(73) Assignee: ATF Services PTY LTD., New South Wales (AU)

( * ) Notice: Subject to any disclaimer, the term of this patent is extended or adjusted under 35 U.S.C. 154(b) by 0 days.

(21) Appl. No.: 15/579,248

(22) PCT Filed: Jun. 9, 2016

(86) PCT No.: PCT/AU2016/050461
§ 371 (c)(1),
(2) Date: Dec. 4, 2017

(87) PCT Pub. No.: WO2016/197192
PCT Pub. Date: Dec. 15, 2016

(65) Prior Publication Data
US 2018/0155950 A1  Jun. 7, 2018

(30) Foreign Application Priority Data
Jun. 10, 2015 (AU) ................................ 2015902192

(51) Int. Cl.
*E04H 12/18* (2006.01)
*F21S 8/08* (2006.01)
(Continued)

(52) U.S. Cl.
CPC ........... *E04H 12/187* (2013.01); *E05F 15/60* (2015.01); *F21S 8/08* (2013.01); *F21S 8/086* (2013.01);
(Continued)

(58) Field of Classification Search
None
See application file for complete search history.

(56) References Cited

U.S. PATENT DOCUMENTS 3,463,916 A * 8/1969 Debella .................... B60P 3/18
362/403
4,600,980 A   7/1986 Dahlgren
(Continued)

FOREIGN PATENT DOCUMENTS

AU   2013270476 A1   6/2014
CA      1245615 A    11/1988
(Continued)

OTHER PUBLICATIONS

Search Report from corresponding Australian National Application No. 2015902192 dated Apr. 13, 2016.
(Continued)

*Primary Examiner* — WB Perkey
(74) *Attorney, Agent, or Firm* — Tutunjian & Bitetto, P.C.

(57) ABSTRACT

A collapsible equipment tower is operable between an extended configuration and a contracted configuration. The equipment tower has a base, having a base frame and supporting a solar panel, and a pivot support, having a distal end for supporting equipment and a proximal end. The pivot support is pivotally connected to the base frame at a pivot joint at the proximal end and is pivotable between a substantially upright position in the extended configuration and a transverse position in the contracted configuration. A retractable locking member is provided at the proximal end of the pivot support adjacent to the pivot joint. The locking member is adapted to be extended from the proximal end and secured to the base frame in the extended configuration and to be retracted in the contracted configuration.

18 Claims, 8 Drawing Sheets

(51) Int. Cl.

| | | |
|---|---|---|
| *F21S 9/03* | (2006.01) | |
| *F21V 21/26* | (2006.01) | |
| *H02S 40/38* | (2014.01) | |
| *H02S 20/30* | (2014.01) | |
| *H02S 99/00* | (2014.01) | |
| *G03B 17/56* | (2006.01) | |
| *E05F 15/60* | (2015.01) | |
| *F21V 21/14* | (2006.01) | |
| *F21W 131/10* | (2006.01) | |

(52) U.S. Cl.
CPC .............. *F21S 9/03* (2013.01); *F21S 9/032* (2013.01); *F21V 21/14* (2013.01); *F21V 21/26* (2013.01); *G03B 17/561* (2013.01); *H02S 20/30* (2014.12); *H02S 40/38* (2014.12); *H02S 99/00* (2013.01); *E05Y 2900/40* (2013.01); *F21W 2131/10* (2013.01); *F21W 2131/1005* (2013.01); *Y02B 20/72* (2013.01)

(56) References Cited

U.S. PATENT DOCUMENTS

| | | |
|---|---|---|
| 5,129,199 A | 7/1992 | Miller et al. |
| 6,692,142 B1 | 2/2004 | Gordin et al. |
| 8,733,963 B2 | 5/2014 | Sharpley et al. |
| 8,833,985 B2 | 9/2014 | Robertson et al. |
| 8,910,431 B2 | 12/2017 | Egan et al. |
| 2010/0232148 A1 | 9/2010 | Sharpley et al. |
| 2012/0201016 A1 | 8/2012 | Robertson et al. |
| 2013/0176434 A1* | 7/2013 | Pierce .................... H04N 7/183 348/148 |
| 2014/0115977 A1 | 5/2014 | Egan et al. |
| 2014/0211490 A1 | 7/2014 | Sharpley et al. |
| 2014/0347873 A1 | 11/2014 | Robertson et al. |
| 2014/0240968 A1 | 8/2017 | Brown |
| 2018/0155950 A1* | 6/2018 | Van Wyk .................. F21S 8/08 |

FOREIGN PATENT DOCUMENTS

| | | |
|---|---|---|
| GB | 2248267 A | 4/1992 |
| GB | 2248267 B | 1/1994 |
| WO | 2010104787 A1 | 9/2010 |

OTHER PUBLICATIONS

Written Opinion from corresponding International Application No. PCT/AU2016/050461 dated Aug. 31, 2016.

* cited by examiner

EQUIPMENT TOWER

TECHNICAL FIELD

The present disclosure relates to a collapsible equipment tower. In particular, the present invention relates to an equipment tower for supporting equipment such as lighting apparatus and cameras in remote locations.

BACKGROUND OF THE INVENTION

Construction, industrial or mining worksites often require the installation of temporary lighting and/or surveillance equipment at an elevated height. Temporary or movable lighting and/or surveillance equipment is also required in many other remote or isolated applications. Other equipment requiring an electricity supply, such as motorised gates, may also be required for temporary installations.

As work progresses or finishes, the equipment may need to be relocated to follow the work location or be removed altogether. Mobile towers mounted on a wheel base or tripod are commonly provided for temporary installations. Such installations are typically complex constructions that are expensive to manufacture, transport and assemble.

Maintenance may also need to be carried out on the equipment during its deployment. Towers that allow the equipment to be lowered for maintenance typically have complex and expensive built-in mechanisms for raising and lowering the equipment. This results in the towers being expensive to manufacture.

Electrical equipment located in remote locations will often not have access to a power grid and typically mobile equipment installations require an independent source of power, such as a diesel generator. Diesel generators are typically provided with the equipment tower and are used as the exclusive source of power for the electrical equipment. However, diesel generators are noisy, produce greenhouse gases and other pollutants, and require regular service to fill the diesel tank. In addition, diesel generators are dangerous if operated indoors or in a confined space.

As an alternative, solar panels may be used to provide power to the electrical equipment. However, having solar panels provided on the tower can interfere with the operation of the electrical equipment, by obscuring the view of the camera or casting a shadow.

Locating solar panels at the top of the equipment tower results in the equipment being cumbersomely heavy. This typically requires a much stronger support post and base to support the extra weight and, if the tower is collapsible, will usually mean that the equipment tower cannot be raised manually. The wind load on solar panels at the top of an equipment tower also creates a large moment at the base of the equipment tower, which means that the base needs wide and heavy duty stabilisers. The additional weight and size of the stronger support post and stabilisers adds to the manufacturing complexity and cost of the equipment tower and results in a larger more unwieldy apparatus.

As a result, known towers tend to be large, heavy and have fixed dimensions. This makes them difficult and expensive to transport, install and remove.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a collapsible equipment tower operable between an extended configuration and a contracted configuration, the equipment tower comprising:

a base having a base frame and supporting a solar panel;

a pivot support having a distal end for supporting equipment and a proximal end, the pivot support being pivotally connected to the base frame at a pivot joint at the proximal end, the pivot support being pivotable between a substantially upright position in the extended configuration and a transverse position in the contracted configuration; and a retractable locking member provided at the proximal end of the pivot support adjacent to the pivot joint;

wherein the locking member is adapted to be extended from the proximal end and secured to the base frame in the extended configuration and to be retracted in the contracted configuration.

In a preferred embodiment, the base frame is provided with a locking device that is adapted to engage and retain a distal end of the locking member in the extended configuration.

Preferably, the locking member is telescopically received within the pivot support and is adapted to slide relative to the pivot support between a retracted position and an expanded position.

In a preferred embodiment, in the retracted position, substantially all of the locking member is withdrawn into the pivot support and, in the expanded position, substantially all of the locking member projects beyond the proximal end of the pivot support.

Preferably, in the retracted position, substantially all of the locking member is located between the pivot joint and the distal end of the pivot support.

In a preferred embodiment, the base frame has a lateral periphery and, in the contracted configuration, the locking member is located substantially within the lateral periphery of the base frame.

The solar panel is preferably located at a height that is below a height of the pivot joint. Preferably, the solar panel is arranged at a height of at least 2 meters above ground level. Further preferably, the solar panel is arranged at a height of 2.2 meters above ground level. The solar panel is preferably fixed in position.

In a preferred embodiment, the base comprises a hollow chamber for receiving removable ballast blocks.

The base preferably comprises a battery casing for receiving a battery and cabling connecting the battery to the solar panel and equipment.

In a preferred embodiment, the pivot support supports at least one of a camera and lighting equipment. Further preferably, a rotatable mounting is provided at the distal end of the pivot support, the rotatable mounting being adapted to mount the camera and/or lighting equipment.

Preferably, a cradle supported by the base frame is provided for receiving and supporting the distal end of the pivot support.

The equipment tower preferably further comprises a communications control box mounted on the pivot support for controlling the equipment.

In a preferred embodiment, the base is dimensioned to correspond in footprint to a standard shipping pallet.

In a preferred embodiment, the equipment tower further comprises:

an upper support mounted at the distal end of the pivot support for slidable movement relative to the pivot support in a lengthwise direction of the pivot support; and an arm support mounted transversely on the upper support for slidable movement relative to the upper support in a transverse direction of the pivot support, wherein said equipment is mounted on said arm support.

In a second aspect, the present disclosure provides a demountable gate assembly comprising:

at least one collapsible equipment tower according to the first aspect; and a motorised gate powered and controlled by equipment on the collapsible equipment tower.

In a preferred embodiment, the collapsible equipment tower includes a communications control box that is programmed to operate the opening and closing of the gate.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Figure 1:
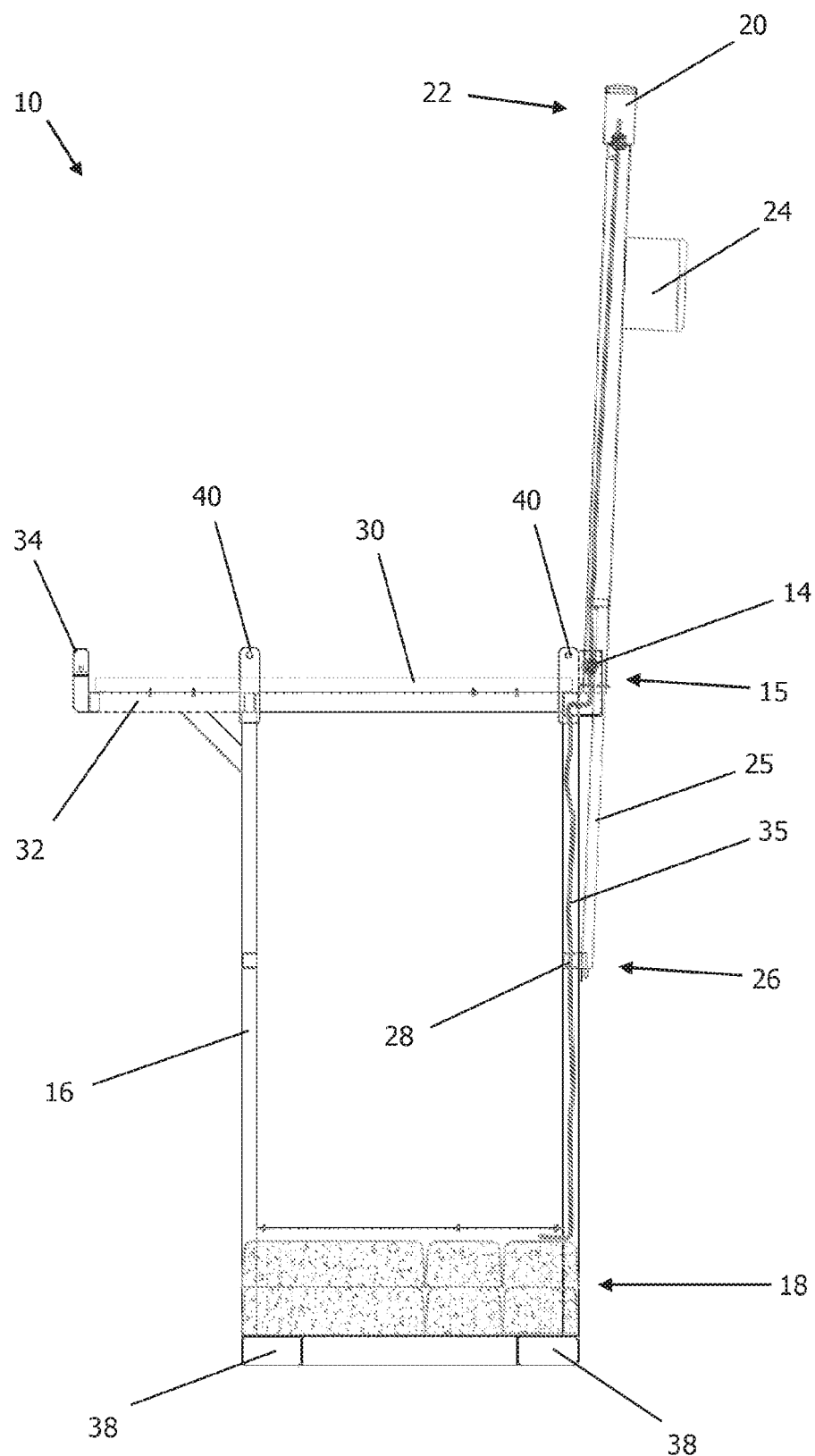
FIG. 1 is a side view of a collapsible equipment tower in an extended configuration.
Figure 2:
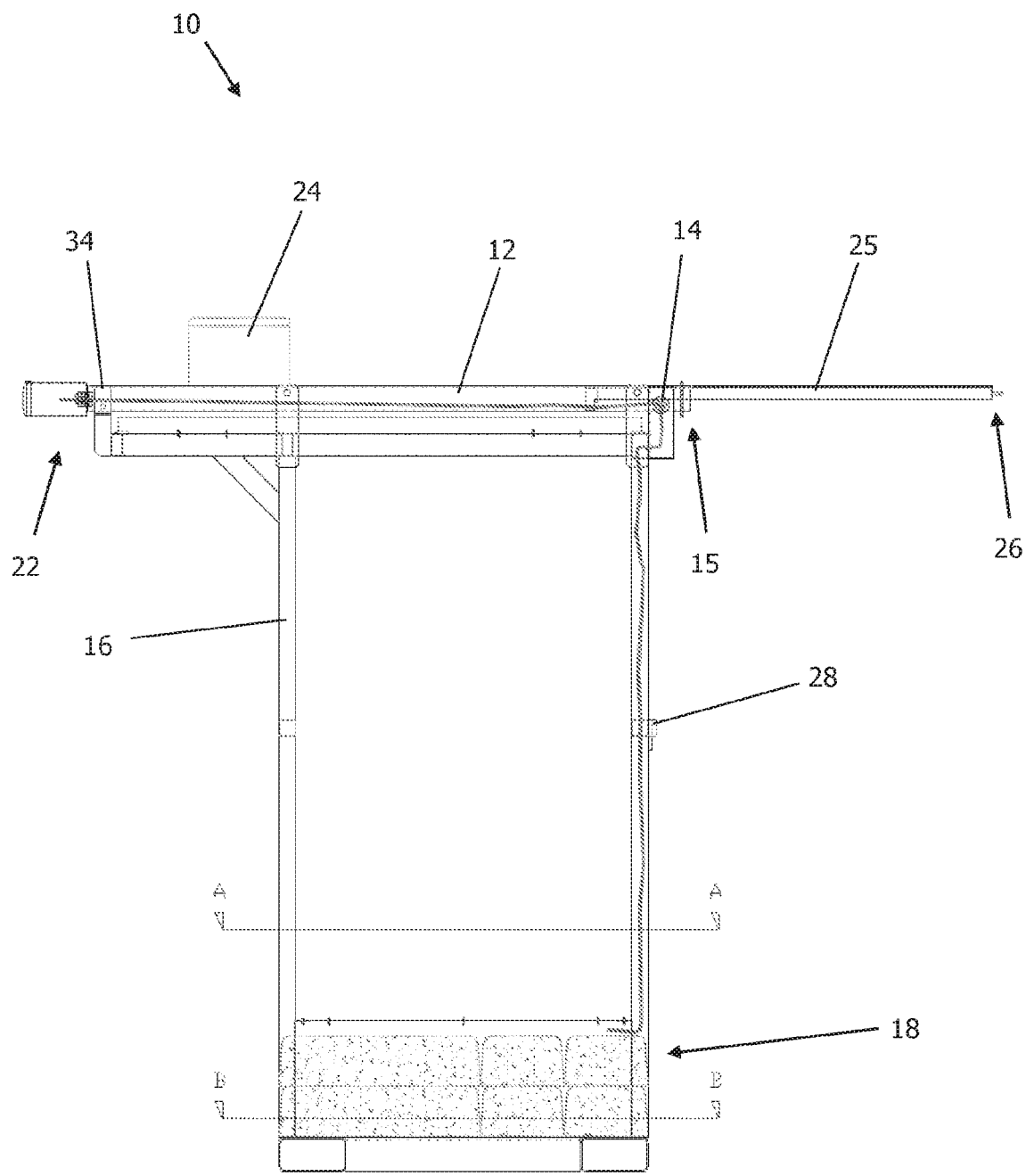
FIG. 2 is a side view of the collapsible equipment tower of FIG. 1 in a collapsed configuration.
Figure 3:
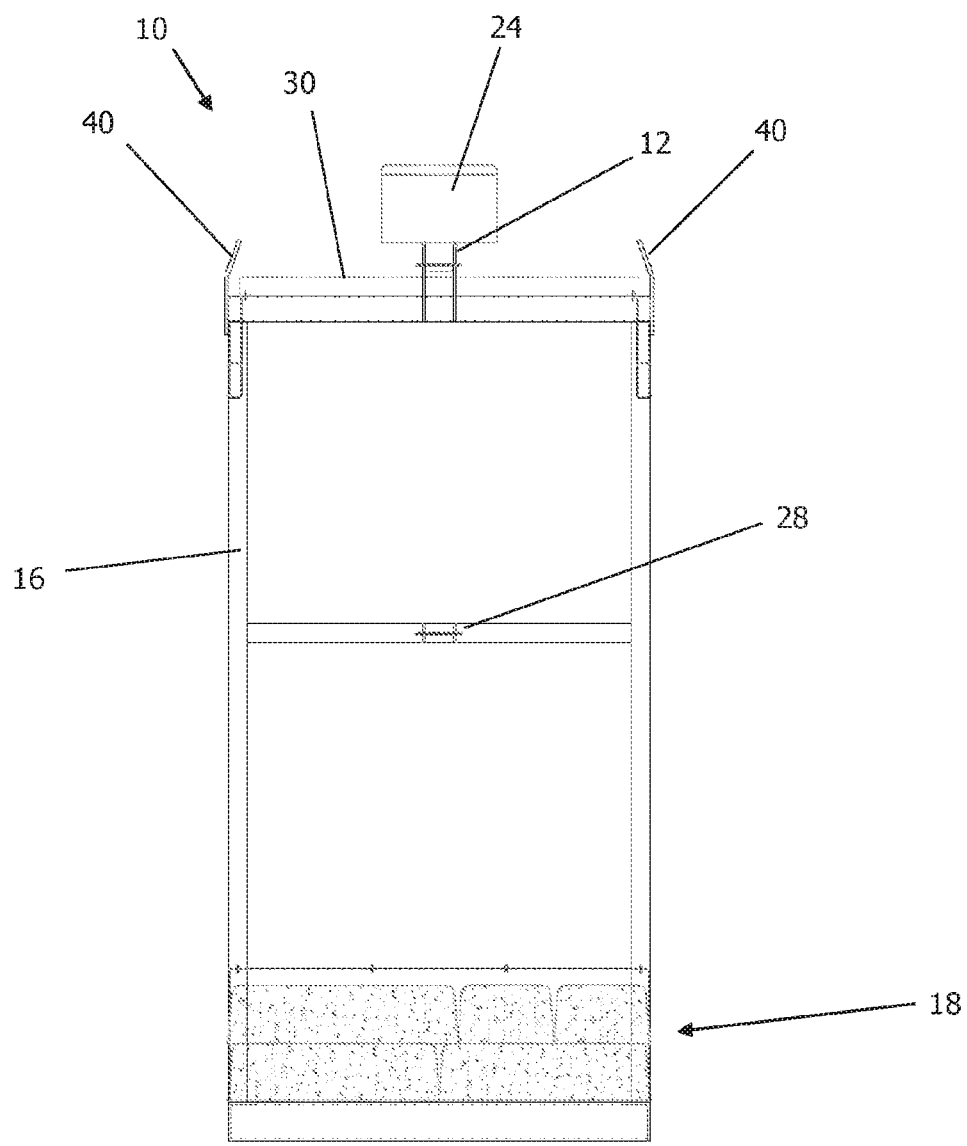
FIG. 3 is an end view of the collapsible equipment tower of FIG. 2.
Figure 4:
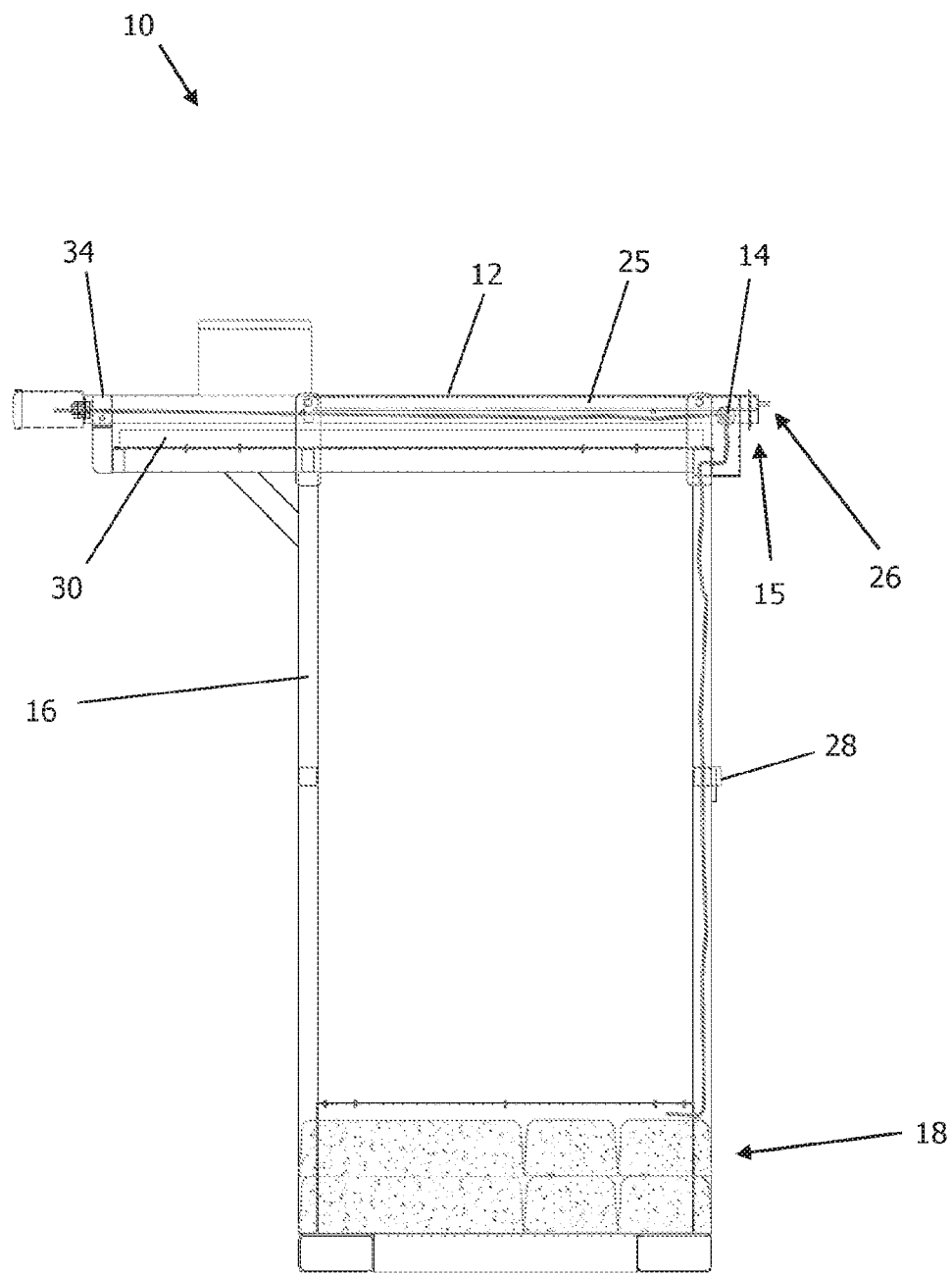
FIG. 4 is a side view of the collapsible equipment tower of FIG. 1 in a contracted configuration.

An embodiment of a collapsible equipment tower 10 is depicted in FIG. 1 in an extended configuration, in FIGS. 2 and 3 in a collapsed configuration, and in FIG. 4 in a contracted configuration. The collapsible equipment tower 10 comprises a pivot support 12 pivotally mounted to a base frame 16 via a pivot joint 14 at a proximal end 15 of the pivot support 12. The base frame 16 is supported on a base 18, which, in a preferred embodiment, has a footprint corresponding to a standard sized shipping pallet (ie. 1.165 m×1.165 m).

Equipment mountings 20 for mounting equipment, such as cameras, lighting equipment, weather stations, pollution sensors and other electronic equipment, on the equipment tower 10 are provided at a distal end 22 of the pivot support 12. In one embodiment, the equipment is a camera and the equipment mountings 20 are rotatable relative to the pivot support 12, providing a rotatable mounting for the camera. A communications control box 24 is provided for controlling the equipment. The control box 24 is preferably provided on the pivot support 12 as depicted but may be provided at other locations on the tower 10.

The pivot support 12 is pivotally connected to the base frame 16 at the pivot joint 14 at the proximal end 15 of the pivot support 12. The pivot support 12 is pivotable between a substantially upright position in the extended configuration shown in FIG. 1 and a transverse position in the collapsed and contracted configurations shown in FIGS. 2 and 4, respectively.

A retractable locking member 25 having a distal end 26, is mounted at the proximal end 15 of the pivot support 12 adjacent to the pivot joint 14. The locking member 25 is telescopically received in, and slidable relative to, the pivot support 12 between an expanded position, as shown in FIGS. 1 and 2, and a retracted position, as shown in FIG. 4. When the tower 10 is in the extended configuration, the locking member 25 is in the expanded position, as shown in FIG. 1, and the distal end 26 of the locking member 25 is aligned with a locking device 28 mounted on the base frame 16. The locking device 28 may be a bolt, lug or latch or any device capable of retaining the distal end 26 of the locking member 25 in position relative to the base frame 16.

A solar panel 30 is supported by panel supports 32 on the base frame 16. A cradle 34 is provided on the panel supports 32 for receiving and supporting the distal end 22 of the pivot support 12 in the collapsed and contracted configurations. The solar panel 30 is arranged at a height just below the pivot joint 14. This provides a very compact arrangement in the contracted configuration, while still supporting the solar panel 30 in an elevated but fixed position. Having the solar panel 30 in a fixed position means that the pivot support 12 only needs to support the weight of the equipment and as a result, in most cases, can be operated by hand.

Figure 6:
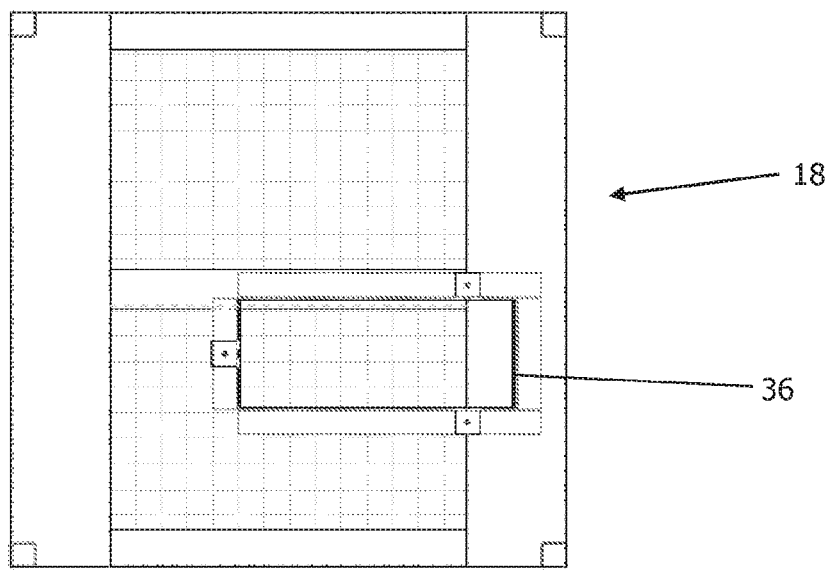
FIG. 6 is a cross-sectional view taken along the line B-B in FIG. 2

Cabling 35 extends between the base 18, the solar panel 30, the communications control box 24 and the equipment mountings 20. As depicted in FIG. 6, the base 18 includes a battery casing 36 for securing a battery or battery pack. The cabling 35 connects the battery to the solar panel 30 and equipment and allows power generated by the solar panel 30 to be stored in the battery and consumed by the equipment as required.

A heavy base 18 is required to provide sufficient ballast for the equipment tower 10 to remain upright in strong wind conditions. The base 18 provides a hollow chamber adapted to receive ballast blocks of dense material such as concrete. The hollow chamber is closed by a removable base cover 37, shown in FIG. 5, which secures the ballast blocks and battery in the base 18. In this way, the base 18 provides an adjustable system for determining the weight of the base 18, as the amount or density of the ballast blocks can be varied on the same tower 10 for different weight requirements, such as greater ballast for installations in areas of high wind load conditions.

The base 18 also includes a pair of elongate apertures 38, provided in this embodiment by a pair of rectangular hollow section (RHS) beams. These apertures 38 are adapted to receive the forks of a forklift to assist in manoeuvring the tower 10 during transport, deployment and removal. Lifting lugs 40 are provided on the base frame 16 to allow the tower 10 to be lifted by a crane.

In one embodiment, the height of the solar panel 30 is sufficiently high to provide head clearance to an operator of the equipment tower 10. In one example, the height of the solar panel is at least 2 meters from the ground level and preferably, 2.2 meters from the ground level.

In operation, the tower 10 is loaded with appropriate ballast for the specific assignment and the base 18 is closed and secured. The tower 10 is typically stored and transported in the contracted configuration shown in FIG. 4. When the tower 10 arrives on site, the tower 10 is maneuvered into position using the forklift apertures 38 and/or the lifting lugs 40.

Once in place, the tower 10 is operated from the contracted configuration shown in FIG. 4 to the collapsed configuration shown in FIG. 2 by extending the locking member 25 from the retracted position shown in FIG. 4 to the expanded position shown in FIG. 2. In the expanded position, substantially all of the locking member 25 projects beyond the proximal end 15 of the pivot support 12.

The tower 10 is then operated from the collapsed configuration shown in FIG. 2 to the extended configuration shown in FIG. 1 by pivoting the pivot support 12 about the pivot joint 14. This pivoting movement of the pivot support 12 is limited by the distal end 26 of the locking member 25 engaging the locking device 28 on the base frame 16. The locking device 28 is used to lock the distal end 26 of the locking member 25 to the base frame 16. This maintains the tower 10 in the extended configuration shown in FIG. 1 and the tower 10 is ready for use.

When the tower 10 needs to be moved to a new location or removed altogether, the above process can be reversed to return the tower 10 to the contracted configuration shown in FIG. 4, ready for transportation and storage.

In the contracted configuration, substantially all of the locking member 25 is withdrawn into the pivot support 12 and substantially all of the locking member 25 is located between the pivot joint 14 and the distal end 22 of the pivot support 12. This provides a very compact arrangement in the contracted configuration.

Figure 5:
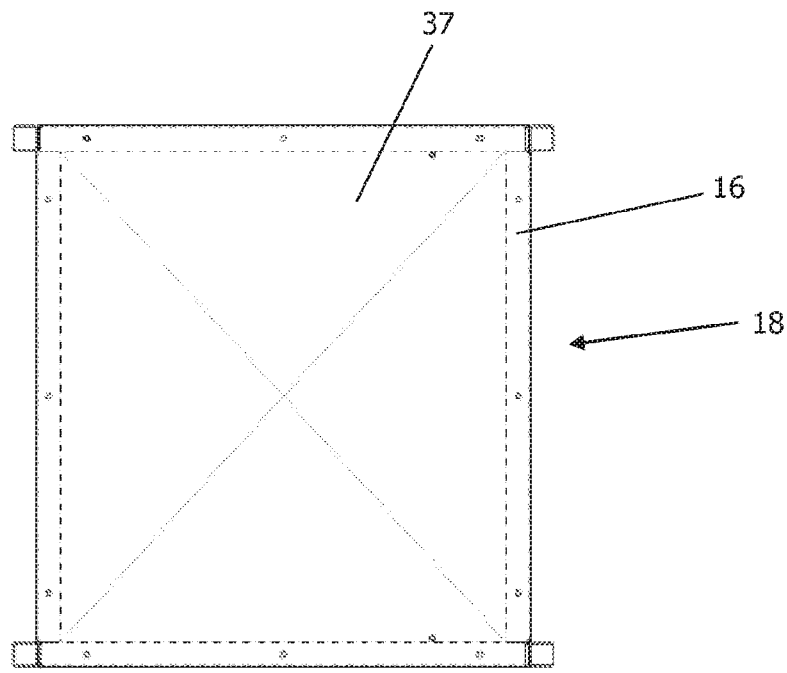
FIG. 5 is a cross-sectional view taken along the line A-A in FIG. 2.

The base frame 16 has a lateral periphery that is approximately the same as the footprint of the base 18, as is evident from FIG. 5. In the contracted configuration, the locking member 25 and the pivot support 12 are located substantially within the lateral periphery of the base frame 16. This also helps to provide a very compact arrangement in the contracted configuration. By not projecting significantly beyond the lateral periphery of the base frame 16, the pivot support 12 and locking member 25 are arranged substantially within the lateral periphery of the base frame 16 in the contracted configuration, providing a very compact arrangement.

The compact nature of the tower 10 in the contracted configuration means that the tower 10 can be stored and transported efficiently and easily. The unique design of the tower 10, having the retractable locking member 25, allows the tower 10 to be installed and erected easily by hand, while providing a robust equipment tower 10 with elevated solar panels 30 to minimise vandalism and maximise sun exposure to the solar panels 30. The compact standard pallet sized design facilitates shipping and storage of the tower 10 in the contracted configuration as it is able to be handled as a standard shipping pallet.

Figure 7:
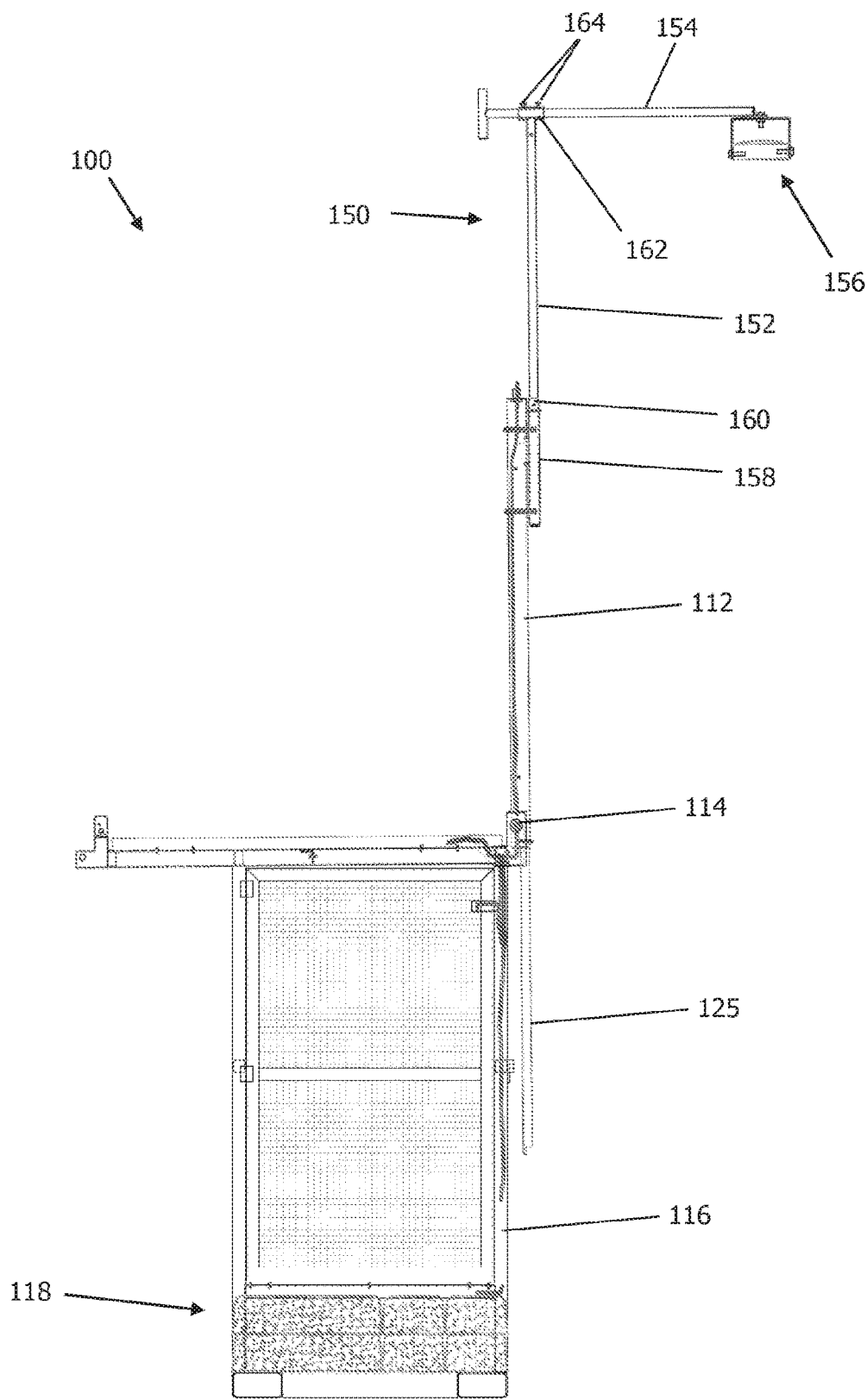
FIG. 7 is a side view of an alternative collapsible equipment tower in an extended configuration.
Figure 8:
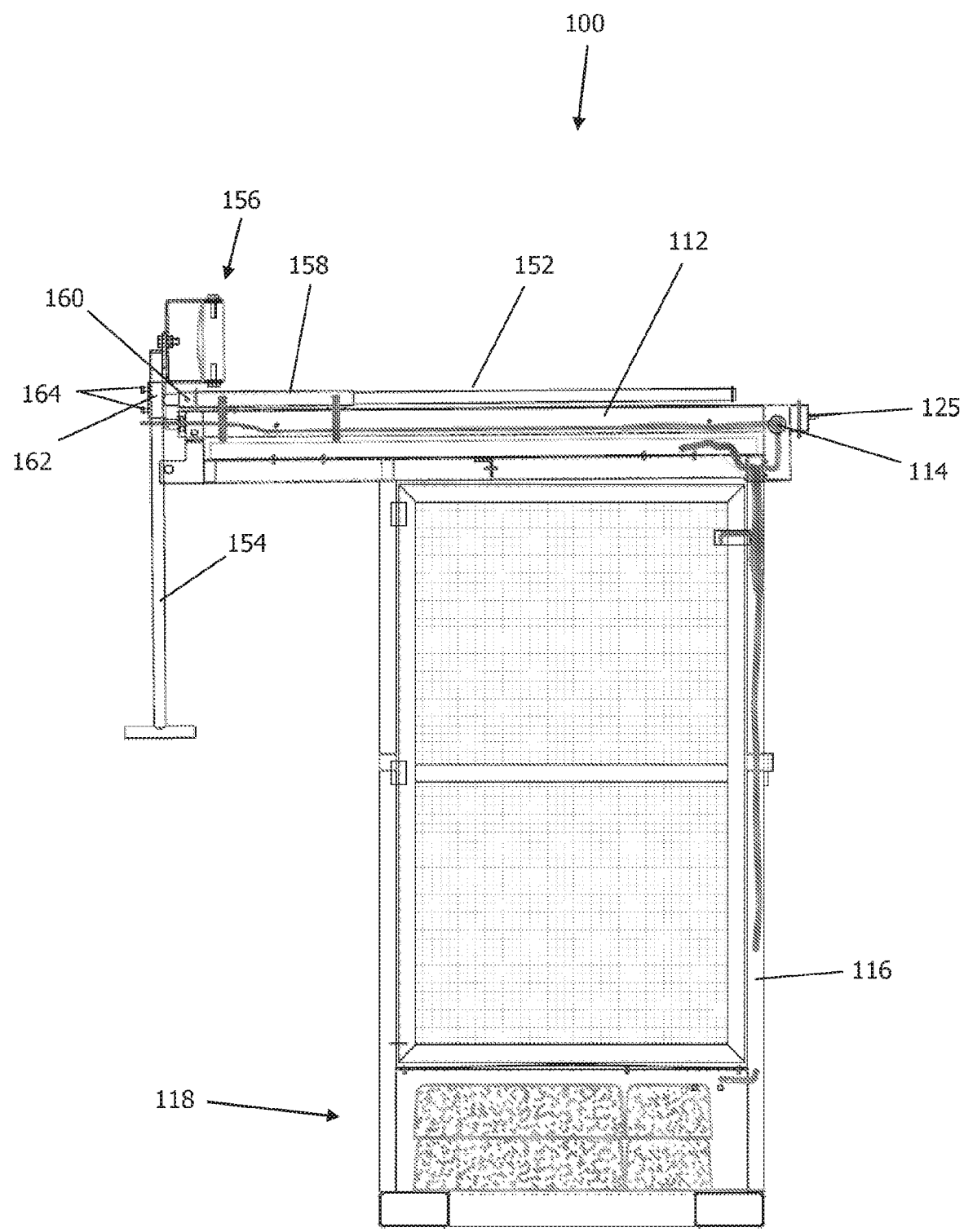
FIG. 8 is a side view of the collapsible equipment tower of FIG. 7 in a contracted configuration.

Another embodiment of a collapsible equipment tower 100 is depicted in FIG. 7 in an extended configuration and in FIG. 8 in a contracted configuration. The tower 100 is similar to the tower 10 depicted in FIGS. 1 to 6, having a pivot support 112, a pivot joint 114, a base frame 116, a base 118, and a locking member 125. The operation of the tower 100 between the extended configuration and the contracted configuration in respect of the pivot support 112 and the locking member 125 functions in the same manner as described above in respect of the tower 10 of FIGS. 1 to 6. The tower 100 also has an adjustable equipment mounting device 150, which is mounted to the pivot support 112.

The equipment mounting device 150 has an upper support 152 mounted to the pivot support 112 and a support arm 154 mounted to the upper support 152. The support arm 154 is adapted to support equipment 156, such as lighting and/or camera equipment, by way of brackets or other mounting means.

The upper support 152 is mounted by way of a first sleeve 158 allowing the upper support 152 to slide axially within the first sleeve 158 between an extended position, shown in FIG. 7 and a retracted position, shown in FIG. 8. The upper support 152 can be locked in either position by way of at least one locking bolt 160. In this embodiment, the upper support 152 is mounted in the first sleeve 158 adjacent and parallel to the pivot support 112. In an alternative embodiment, the upper support 152 may be telescopically received in the pivot support 112.

The upper support 152 has a second sleeve 162 at a distal end, within which the support arm 154 is received, allowing the support arm 154 to slide relative to the upper support 152, by sliding axially within the second sleeve 162. In this embodiment, the second sleeve 162 and the support arm 154 are arranged transverse and perpendicular to the upper support 152. The support arm 154 can be locked in multiple positions by way of at least one locking bolt 164.

When the tower 100 is installed for operation, the support arm 154 and the upper support 152 are drawn out and locked in the extended positions depicted in FIG. 7. This is typically performed prior to pivoting the pivot support 112 into the upright position of the extended configuration. With the support arm 154 in the extended position, lighting equipment 156 can be arranged directly over a worksite.

When the tower 100 is being returned to the contracted configuration depicted in FIG. 8, once the pivot support 112 has been lowered, the upper support 152 and the support arm 154 can be retracted. This contracted configuration, depicted in FIG. 8, provides a very compact arrangement for transporting and storing the tower 100.

Figure 9:
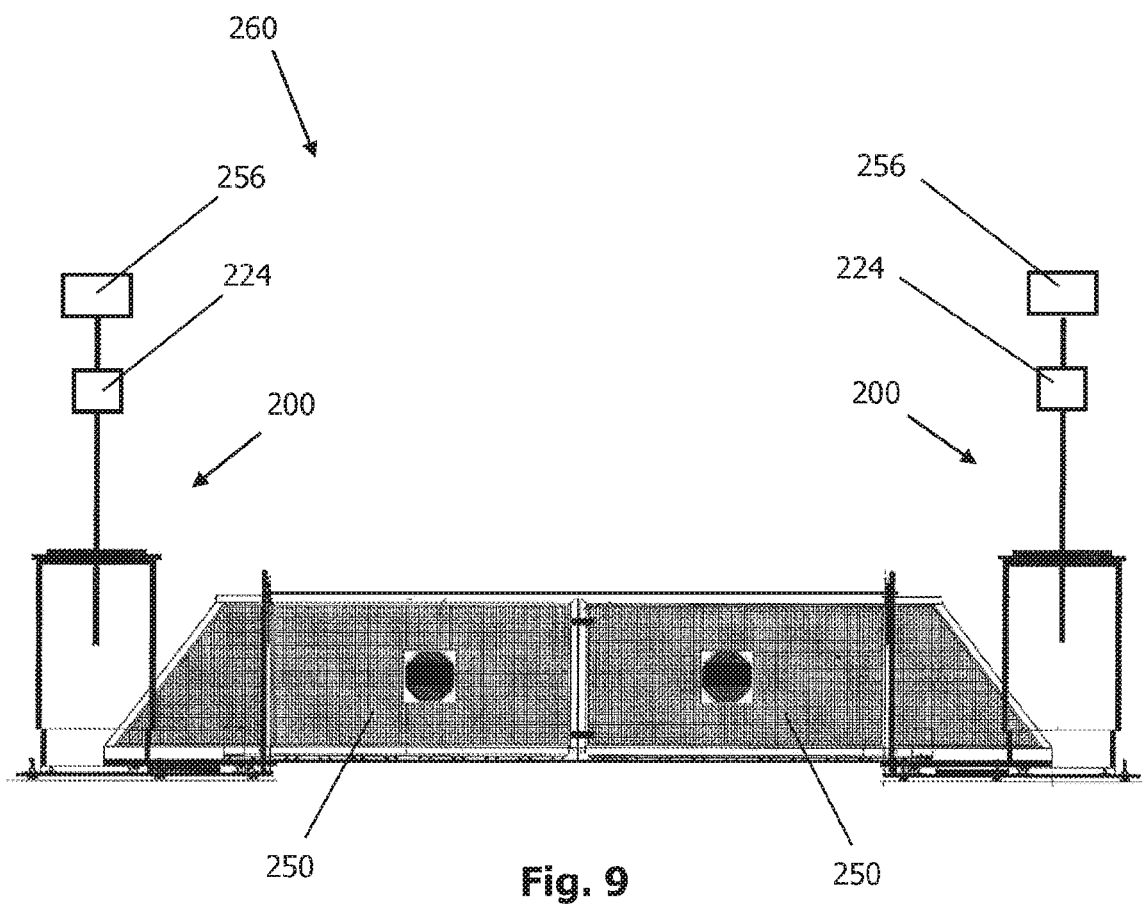
FIG. 9 is an elevation view of a demountable gate assembly.
Figure 10:
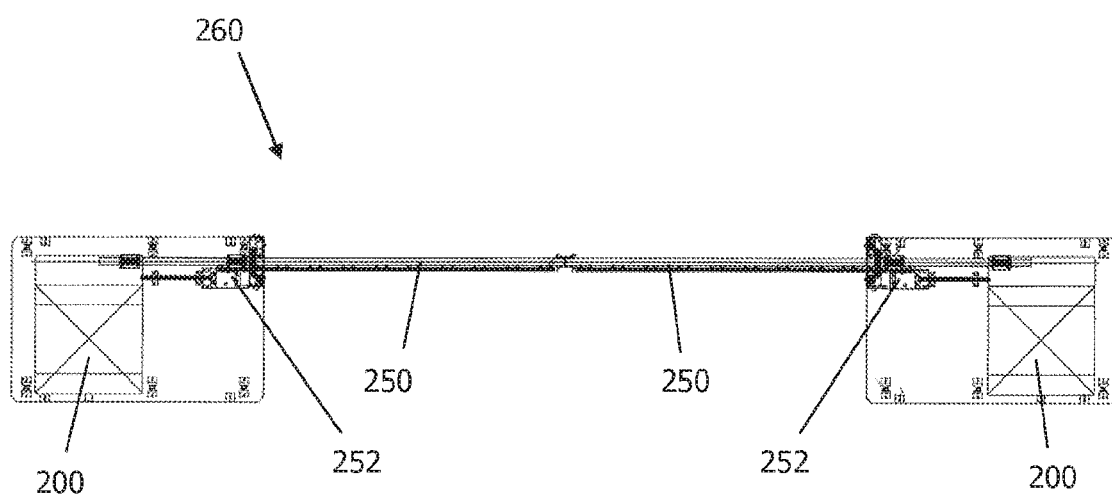
FIG. 10 is a plan view of the demountable gate assembly of FIG. 9.

In a further embodiment, depicted in FIGS. 9 and 10, the equipment tower 200 can be integrated with other equipment, such as a motorised gate 250, to provide a demountable gate assembly 260. The equipment tower 200 controls operation of, and supplies power to, the gates 250 in addition to controlling and powering the lighting and/or camera equipment 256 provided on the equipment tower 200. In the example depicted, the arrangement comprises two cantilevered gates 250, driven by electric motors 252, opposing one another with an equipment tower 200 integrated with each gate 250. Alternatively, a single gate 250 could be associated with, and operated by, an equipment tower 200, or one equipment tower 200 could control the operation of one or two gates 250. Other types of gates or equipment may also be associated with, and powered by, the equipment tower 200.

In this arrangement, the tower 200, via the communications control box 224, can power and control the lighting and camera equipment 256 focused on the area surrounding the gate 250 and can also power and control the opening and closing of the gate 250. The communications control box 224 can communicate with remote systems and/or devices, either directly or via the internet, such that the gate 250 can be controlled from remote locations. This allows an operator or automated system to identify, via video feed from the camera equipment, a vehicle or individual approaching the gate 250 and to authorise the gate 250 to open.

Although the invention has been described with reference to specific examples, it will be appreciated by those skilled in the art that the invention may be embodied in many other forms.

The invention claimed is:

1. A collapsible equipment tower operable between an extended configuration and a contracted configuration, the equipment tower comprising:
   a base having a base frame and supporting a solar panel;
   a pivot support having a distal end for supporting equipment and a proximal end, the pivot support being pivotally connected to the base frame at a pivot joint at the proximal end, the pivot support being pivotable between a substantially upright position in the extended configuration and a transverse position in the contracted configuration; and
   a retractable locking member provided at the proximal end of the pivot support adjacent to the pivot joint;
   wherein the locking member is adapted to be extended from the proximal end and secured to the base frame in the extended configuration and to be retracted in the contracted configuration.

2. The equipment tower of claim 1, wherein the base frame is provided with a locking device that is adapted to engage and retain a distal end of the locking member in the extended configuration.

3. The equipment tower of claim 1, wherein the locking member is telescopically received within the pivot support and is adapted to slide relative to the pivot support between a retracted position and an expanded position.

4. The equipment tower of claim 3, wherein in the retracted position, substantially all of the locking member is withdrawn into the pivot support and, in the expanded position, substantially all of the locking member projects beyond the proximal end of the pivot support.

5. The equipment tower of claim 4, wherein in the retracted position, substantially all of the locking member is located between the pivot joint and the distal end of the pivot support.

6. The equipment tower of claim 1, wherein the base frame has a lateral periphery and, in the contracted configuration, the locking member is located substantially within the lateral periphery of the base frame.

7. The equipment tower of claim 1, wherein the solar panel is located at a height that is below a height of the pivot joint.

8. The equipment tower of claim 1, wherein the solar panel is arranged at a height of at least 2 meters above ground level.

9. The equipment tower of claim 1, wherein the solar panel is fixed in position.

10. The equipment tower of claim 1, wherein the base comprises a hollow chamber for receiving removable ballast blocks.

11. The equipment tower of claim 1, wherein the base comprises a battery casing for receiving a battery and cabling connecting the battery to the solar panel and equipment.

12. The equipment tower of claim 1, wherein the pivot support supports at least one of a camera and lighting equipment and a rotatable mounting is provided at the distal end of the pivot support, the rotatable mounting being adapted to mount the camera and/or lighting equipment.

13. The equipment tower of claim 1, wherein a cradle supported by the base frame is provided for receiving and supporting the distal end of the pivot support.

14. The equipment tower of claim 1, further comprising a communications control box mounted on the pivot support for controlling the equipment.

15. The equipment tower of claim 1, wherein the base is dimensioned to correspond in footprint to a standard shipping pallet.

16. The equipment tower of claim 1, further comprising:
   an upper support mounted at the distal end of the pivot support for slidable movement relative to the pivot support in a lengthwise direction of the pivot support; and
   an arm support mounted transversely on the upper support for slidable movement relative to the upper support in a transverse direction of the pivot support, wherein said equipment is mounted on said arm support.

17. A demountable gate assembly comprising:
   at least one collapsible equipment tower according to claim 1; and
   a motorized gate powered and controlled by the collapsible equipment tower.

18. The demountable gate assembly of claim 17, wherein the collapsible equipment tower further comprises a communications control box that is programmed to operate the opening and closing of the gate.

* * * * *